US009329346B2

(12) United States Patent
Won et al.

(10) Patent No.: US 9,329,346 B2
(45) Date of Patent: May 3, 2016

(54) INTEGRATED CIRCUIT COUPLING SYSTEM WITH WAVEGUIDE CIRCUITRY AND METHOD OF MANUFACTURE THEREOF (71) Applicant: NeoPhotonics Corporation, San Jose, CA (US)

(72) Inventors: Jongik Won, Pleasanton, CA (US); Hsiang En Tseng, Cupertino, CA (US); Luis Martinez, Livermore, CA (US); Anthony J. Ticknor, Cupertino, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 14/705,259

(22) Filed: May 6, 2015

(65) Prior Publication Data

US 2015/0234124 A1 Aug. 20, 2015

Related U.S. Application Data (62) Division of application No. 13/728,966, filed on Dec. 27, 2012.

(60) Provisional application No. 61/580,649, filed on Dec. 27, 2011.

(51) Int. Cl.
*G02B 6/30* (2006.01)
*G02B 6/34* (2006.01)
*G02B 6/42* (2006.01)

(52) U.S. Cl.
CPC .. *G02B 6/30* (2013.01); *G02B 6/34* (2013.01); *G02B 6/4214* (2013.01)

(58) Field of Classification Search
None
See application file for complete search history.

(56) References Cited

U.S. PATENT DOCUMENTS

| 4,698,128 | A | | 10/1987 | Berglund et al. |
| 5,263,111 | A | | 11/1993 | Nurse et al. |
| 5,671,243 | A | * | 9/1997 | Yap ............................ 372/50.23 |
| 5,987,202 | A | * | 11/1999 | Gruenwald et al. ............ 385/49 |
| 6,744,858 | B1 | | 6/2004 | Ryan et al. |
| 8,236,481 | B2 | | 8/2012 | Nottola et al. |

(Continued)

FOREIGN PATENT DOCUMENTS

| EP | 0651266 A2 | 5/1995 |
| WO | 9218888 A1 | 10/1992 |

OTHER PUBLICATIONS

European Search Report for EP Application # 12 863 185.0 Dated Aug. 15, 2015.

*Primary Examiner* — Scott B Geyer
(74) *Attorney, Agent, or Firm* — Ishimaru & Associates LLP (57) ABSTRACT A method of manufacture of an integrated circuit coupling system includes: forming a waveguide assembly, having a top clad over an open end of an optical core; forming a first photoresist having a base photoresist pattern shape with sloped photoresist sidewalls tapered down to expose a portion of the top clad; forming a recess having clad sidewalls from the portion of the top clad exposed by the base photoresist pattern shape, the clad sidewalls having a shape replicating a shape of the base photo resist pattern shape; and forming an optical vertical insertion area, from the clad sidewalls forming the recess, having a pocket trench, a horizontal step, and a mirror with a reflective material selectively applied to a section of the clad sidewalls and exposing the open end opposite to the mirror, the horizontal step between the mirror and the pocket trench.

8 Claims, 9 Drawing Sheets

(56) References Cited

U.S. PATENT DOCUMENTS

| | | |
|---|---|---|
| 2002/0009262 A1 | 1/2002 | Kasama et al. |
| 2004/0240783 A1* | 12/2004 | Junnarkar et al. .............. 385/31 |
| 2005/0111781 A1 | 5/2005 | Jain et al. |
| 2009/0214170 A1 | 8/2009 | Wei et al. |
| 2009/0308839 A1* | 12/2009 | Martini et al. .................. 216/24 |
| 2010/0025361 A1 | 2/2010 | Wei et al. |
| 2012/0092157 A1 | 4/2012 | Tran |
| 2012/0101873 A1 | 4/2012 | Lepore et al. |
| 2012/0115448 A1 | 5/2012 | Rosenhaft et al. |

\* cited by examiner

INTEGRATED CIRCUIT COUPLING SYSTEM WITH WAVEGUIDE CIRCUITRY AND METHOD OF MANUFACTURE THEREOF

CROSS-REFERENCE TO RELATED APPLICATION

This application is a divisional of co-pending U.S. patent application Ser. No. 13/728,966 filed Dec. 27, 2012, now U.S. Pat. No. 9,052,460, which claims the benefit of U.S. Provisional Patent Application Ser. No. 61/580,649 filed Dec. 27, 2011, and the subject matter thereof is incorporated herein by reference thereto.

TECHNICAL FIELD

The present invention relates generally to an integrated circuit coupling system, and more particularly to a system for routing optical signals.

BACKGROUND ART

Monolithically integrated optical waveguide technology provides key components of recent and expected future improvements in telecommunications and other networks. Optical fiber networks are used to convey data in almost all applications where data rates exceed 1 Gb/sec and transmission distances exceed a few meters. Fiber optic networks pervade and enable the networks forming the internet. There are many different technologies for integrated optics, but for interfacing to fiber networks the clear preference and predominant technology is buried-channel silica waveguides on mechanical substrates of silicon or quartz. This class of waveguide circuitry is generally called planar lightwave circuits, or 'PLC'.

Coupling light in and out of PLCs is accomplished by routing the appropriate waveguides to the edge of the PLC substrate and mating optical fibers, photo detectors, or lasers to the waveguides at the substrate edges. The waveguides are defined within a single layer of the PLC and are allowed to cross, but practical waveguide crossings do exhibit small amounts of loss and crosstalk and that does add up for multiple crossings, so it is generally desirable to keep the number of crossings for any optical path to be less than the order of 10. Also, optical cores cannot be bent too sharply, minimum radius of curvature allowed is generally a few millimeters. Because of these limitations, the need to route all the access waveguides to the edge of the PLC chip substantially increases the required size of the chip and/or limits the complexity of the optical design.

Thus, a need still remains for better methods of coupling optical fibers to PLCs. In view of the increasing importance of optical data transmission, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any practicable solutions and, thus, satisfactory solutions to these problems have long eluded those skilled in the art.

DISCLOSURE OF THE INVENTION

The present invention provides a method of manufacture of an integrated circuit coupling system including: forming a waveguide assembly, having a top clad over an open end of an optical core; forming a first photoresist having a base photoresist pattern shape with sloped photoresist sidewalls tapered down to expose a portion of the top clad; forming a recess having clad sidewalls from the portion of the top clad exposed by the base photoresist pattern shape, the clad sidewalls having a shape replicating a shape of the base photo resist pattern shape; and forming an optical vertical insertion area, from the clad sidewalls forming the recess, having a pocket trench, a horizontal step, and a mirror with a reflective material selectively applied to a section of the clad sidewalls and exposing the open end opposite to the mirror, the horizontal step between the mirror and the pocket trench.

The present invention provides an integrated circuit coupling system, including: a top clad having clad sidewalls over the substrate; an optical core having an open end between the substrate and the top clad; and an optical vertical insertion area having a mirror, a horizontal step, and a pocket trench formed, through the top clad, below and between the open end and the mirror opposite the open end exposed in the optical vertical insertion area, the horizontal step between the mirror and the pocket trench.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Similarly, although the views in the drawings for ease of description generally show similar orientations, this depiction in the FIGs. is arbitrary for the most part. Generally, the invention can be operated in any orientation.

The embodiments have been numbered first embodiment, second embodiment, etc. as a matter of descriptive convenience and are not intended to have any other significance or provide limitations for the present invention.

For expository purposes, the term "horizontal" as used herein is defined as a plane parallel to the plane or surface of the substrate below an optical core, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact between two elements and there is no other intervening element between the direct contact of the two elements.

The term "processing" as used herein includes deposition of material or photoresist, patterning, exposure, development, etching, cleaning, and/or removal of the material or photoresist as required in forming a described structure.

Figure 1:
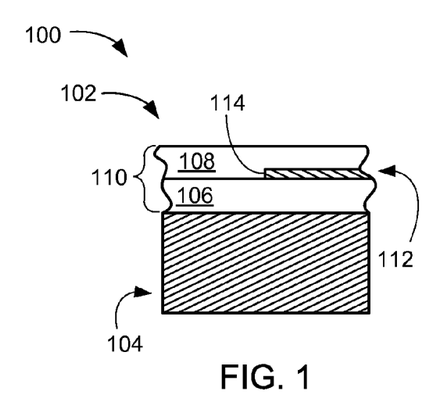
FIG. 1 is a partial cross-sectional view of an integrated circuit coupling system in a manufacturing step of a first embodiment of the present invention.

Referring now to FIG. 1, therein is shown a partial cross-sectional view of an integrated circuit coupling system 100 in a manufacturing step of a first embodiment of the present invention. Shown is an exemplary planar lightwave circuit 102, also referred to as the PLC 102, having a substrate 104, a bottom clad 106, a top clad 108, and an optical core 112. For example, the bottom clad 106 and the top clad 108 can include silica or glass.

The substrate 104, such as a silicon wafer or quartz wafer, is covered with a silica layer that functions as the bottom clad 106 to isolate the light in the optical core 112, also referred to as the silica waveguide channel, from the substrate 104. A deposited layer of doped silica is used to provide the top-clad 108 with side clad for the optical core 112.

An open end 114 of the optical core 112 between the top clad 108 and the bottom clad 106 is sealed by the top clad 108. The optical core 112 with the open end 114, the top clad 108, and the bottom clad 106 can be referred to as a waveguide assembly 110.

The optical core 112, the bottom clad 106, and the top clad 108 can have various thicknesses. The actual thicknesses are very tightly controlled, but across most typical applications, they fall in the following exemplary ranges. For example, a thickness of the optical core 112 is typically in the range of four to six microns. A layer thickness of the bottom clad 106 is typically in the range ten to twenty microns, for example.

A thickness of the top clad 108, for example, is such that its upper surface is ten to twenty microns above an upper surface of the waveguide core. The thicknesses previously described above are examples only, it is understood that they are not intended to show any kind of order, connection, or order of manufacture.

Figure 2:
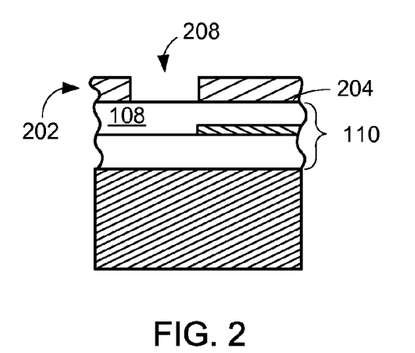
FIG. 2 is the partial cross-sectional view of the structure of FIG. 1 after deposition and photolithographic processing of a first photoresist.

Referring now to FIG. 2, therein is shown the partial cross-sectional view of the structure of FIG. 1 after deposition and photolithographic processing of a first photoresist 202. The photolithographic processing can include binary patterning of the first photoresist 202. The first photoresist 202, also referred to as base photoresist, can be deposited on an upper clad surface 204 of the top clad 108 of the waveguide assembly 110. The first photoresist 202 can be patterned to preserve, by covering, most of the upper clad surface 204 of the PLC 102 surface except for a small open region 208 of the first photoresist 202 exposing at least a portion of the upper clad surface 204 to be etched or removed in later processing steps.

An edge of the first photoresist 202 defining a portion of the small open region 208 can be vertically aligned with the open end 114 of FIG. 1. The first photoresist 202 can be, for example, formed of a polymer photoresist.

Figure 3:
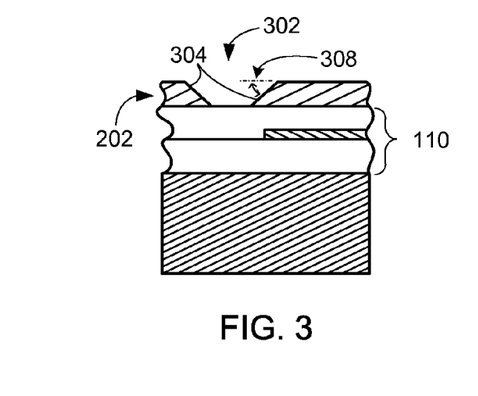
FIG. 3 is the partial cross-sectional view of the structure of FIG. 2 after further processing the first photoresist.

Referring now to FIG. 3, therein is shown the partial cross-sectional view of the structure of FIG. 2 after further processing the first photoresist 202. Although a photoresist layer is not commonly baked aggressively, or not baked at all, in this process sequence the first photoresist 202 can be baked for an extended time. For example, the first photoresist 202 can be baked for 2.5 hours at 110 degrees Celsius.

The baking can cause the first photoresist 202 to reflow, producing a base photoresist pattern shape 302 of the first photoresist 202 having sloped photoresist sidewalls 304 that enclose and taper down to a cross-sectional area of the small open region 208 of FIG. 2. A cross-sectional area of the base photoresist pattern shape 302 above the upper clad surface 204 is larger than the cross-sectional area of the small open region 208 as a result of the narrowing and taper down of the sloped photoresist sidewalls 304.

The sloped photoresist sidewalls 304 expose a portion of the upper clad surface 204 of FIG. 2 laterally offset away from the optical core 112 and opposite the open end 114. The sloped photoresist sidewalls 304 can be formed having an inclination angle 308, relative to a horizontal plane, predetermined by user specifications, as a result of the controlled reflow of the first photoresist 202, characteristic of the first photoresist 202 reflowed by bake process.

It has been discovered that a combination of the first photoresist 202 having reflowable characteristics and applying controlled baking duration and baking temperatures result in the inclination angle 308 formed with precision and accuracy crucial to the production of optimum structural geometries for the present invention and intermediate PLC structures vital to the production of the present invention.

Figure 4:
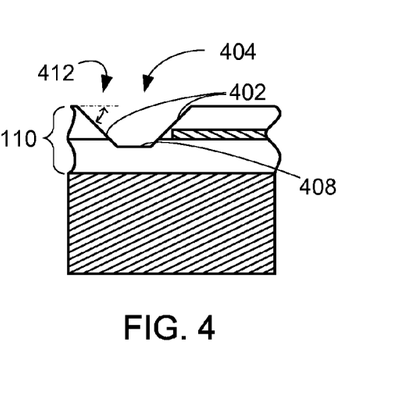
FIG. 4 is the partial cross-sectional view of the structure of FIG. 3 after etching.

Referring now to FIG. 4, therein is shown the partial cross-sectional view of the structure of FIG. 3 after etching. A specific etching process can be used wherein the first photoresist 202 of FIG. 2 and the top clad 108 of FIG. 1 etch at about the same rate resulting in transference or replication of the base photoresist pattern shape 302 of FIG. 2 into the top clad 108 and a portion of the bottom clad 106 of FIG. 1.

For example, the etching can reproduce the sloped photoresist sidewalls 304 of FIG. 3, at a desired slope angle ranging from 45 degrees and up relative to the horizontal plane containing the upper clad surface 204 of FIG. 2, as clad sidewalls 402 of a recess 404 in the top clad 108 and a portion of the bottom clad 106. The clad sidewalls 402 formed into the waveguide assembly 110 can have a shape and a slope angle 412 equal to the base photoresist pattern shape 302 and the inclination angle 308 of FIG. 3, respectively.

The etching process can be to a depth below the upper clad surface 204 such that a bottom base 408 of the recess 404, having the clad sidewalls 402 intersecting the bottom base 408 formed through in the top clad 108, can extend two to five microns into the bottom clad 106. At this point, the optical core 103 can remain buried in the top clad 108. The clad sidewalls 402 and the slope angle 412 are characteristic of the specific etching process to form the clad sidewalls 402 with the slope angle 412 replicating the shape and the inclination angle 308 of the first photoresist 202, reflowed.

It has been discovered that a combination of the first photoresist 202, having reflowable characteristics formed by controlled baking duration and baking temperatures, and the specific etching process described in FIG. 4 result in the slope angle 412 corresponding or equal to the inclination angle 308 resulting in precise formation of the present invention and intermediate PLC structures required for optical applications.

It has also been discovered that a combination of the bottom clad 106, the top clad 108, and the first photoresist 202 using the specific etching process for a specific etch rate to generate the inclination angle 308 and the slope angle 412 having a predictable or predetermined ratio other than 1:1 resulting in precise formation of the present invention and intermediate PLC structures required for optical applications.

The etching process can be different from standard PLC processing which can use reactive-ion etching processes that are typically associated with hardmask-directed etching. A normal etching process can scorch any photoresist, causing it to erode erratically and uncontrollably and substantially reducing the quality of the etching process.

Parameters that follow provide an example of an etching recipe, for gently and in a controlled manner, remove both the top clad and the photoresist in the present invention. One of ordinary skill in the art would understand that the numbers provided are exemplary and the recipe should be tailored to the particular process at hand.

The parameters for Standard Etch of a vertical etch using hard mask are settings developed for a particular Reactive Ion Etching (RIE) machine model for a silica glass doped with 1-5% Boron and 1-5% Phosphorous, also referred to as Boron-Phosphorous Silica Glass or BPSG for etch depths between a few microns and a few tens of microns. Example parameters for a Sloped Etch, exemplary of those used for the present invention, are those that can give a good replication etch for the otherwise same conditions, such as in etching of the first photoresist 202 and the top clad 108 at the same rates in order to get the same shapes.

Based on the particular RIE machine model, for the process parameters of: 3 mTorr pressure for Standard Etch, use 5.8 mTorr for the Sloped Etch; 100 sccm Argon (Ar) flow for Standard Etch, use 150 sccm for the Sloped Etch; 0 sccm Oxygen ($CF_4$) flow for Standard Etch, use 5 sccm for the Sloped Etch; 12 sccm Octafluoropropane ($C_3F_8$) flow for Standard Etch, use 18 sccm for the Sloped Etch; 10 Torr Helium (He) backside pressure for Standard Etch, use 15 Torr for the Sloped Etch; 300 Watt Radio Frequency (RF) bias power for Standard Etch, use 55 Watt for the Sloped Etch; 2 KWatt RF antenna power for Standard Etch, use 700 Watt for the Sloped Etch; 20.4 A magnet top for Standard Etch, use 0 A for the Sloped Etch; 32.0 A magnet middle for Standard Etch, use 0 A for the Sloped Etch; 20.4 A magnet bottom, use 0 A for the Sloped Etch; and 10 degree Celsius (C) coolant temperature for Standard Etch, use −20 degree Celsius (C) for the Sloped Etch.

Figure 5:
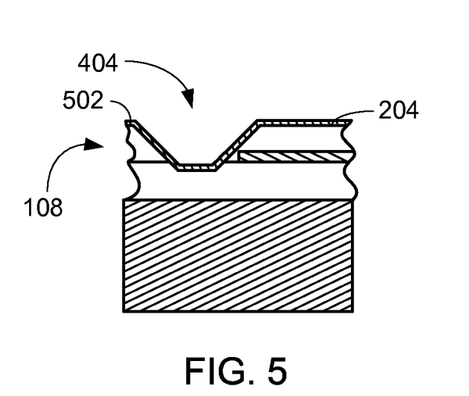
FIG. 5 is the partial cross-sectional view of the structure of FIG. 4 after deposition of a hardmask.

Referring now to FIG. 5, therein is shown the partial cross-sectional view of the structure of FIG. 4 after deposition of a hardmask 502. The hardmask 502, which can be produced from various materials, is layered on an interior of the recess 404 and on the upper clad surface 204 of the top clad 108. For example, a thin layer of suitable hardmask material such as about 5000 angstroms of amorphous silicon, TiO2 or Aluminum, can be deposited to form the hardmask 502. The hardmask 502 is so called because it etches much more slowly than claddings or photoresist during applicable etch processes, protecting anything it covers from the etch process.

Figure 6:
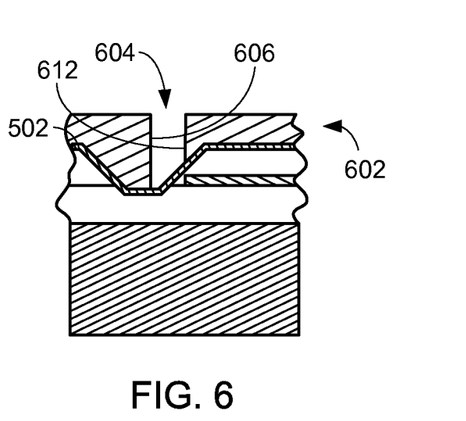
FIG. 6 is the partial cross-sectional view of the structure of FIG. 5 after deposition, patterning, and photolithographic processing of a second photoresist.

Referring now to FIG. 6, therein is shown the partial cross-sectional view of the structure of FIG. 5 after deposition, patterning, and photolithographic processing of a second photoresist 602. The second photoresist 602 can be applied on the hardmask 502. A resist opening 604 of the second photoresist 602, formed by an alignment surface 612 and a boundary surface 606 of the second photoresist 602, can be positioned between the clad sidewalls 402 and substantially or nearly vertically over the recess 404 of FIG. 4. The alignment surface 612 and the boundary surface 606 can be parallel and opposite one another.

The alignment surface 612 can be coplanar with the open end 114 and perpendicular to the upper clad surface 204 of FIG. 2. The boundary surface 606 can be perpendicular to the upper clad surface 204 and positioned vertically over the bottom base 408 of FIG. 4.

All other areas of the hardmask 502 covered by the second photoresist 602 to prevent etching of the waveguide assembly 110 of FIG. 1. In this example, the second photoresist 602 is not baked for reflow and resulting in the alignment surface 612 and the boundary surface 606 remaining as nearly vertical side walls. The second photoresist 602 can also be referred to as the sub-base photoresist.

Figure 7:
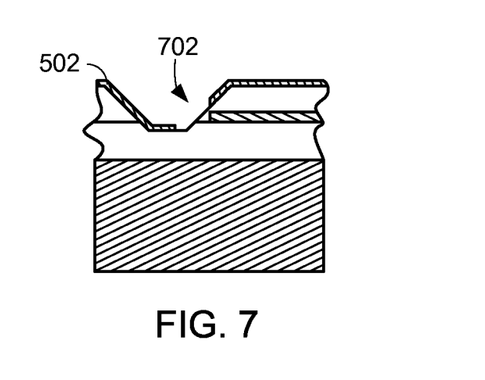
FIG. 7 is the partial cross-sectional view of the structure of FIG. 6 after processing the hardmask and removal of the second photoresist of FIG. 6.

Referring now to FIG. 7, therein is shown the partial cross-sectional view of the structure of FIG. 6 after processing the hardmask 502 and removal of the second photoresist 602 of FIG. 6. For example, an exposed section portion of the hardmask 502 can be removed and the remaining amount of the second photoresist 602 can be stripped off to leave a hard mask pattern formed on the recess 404 of FIG. 4 by the hardmask 502. The hardmask 502 has a gap 702 to guide further etching steps. The gap 702 of the hardmask 502 exposes a portion of the bottom base 408 of FIG. 4 and a portion of the clad sidewalls 402 covering the open end 114 of FIG. 1, abutted to the bottom base 408.

Figure 8A:
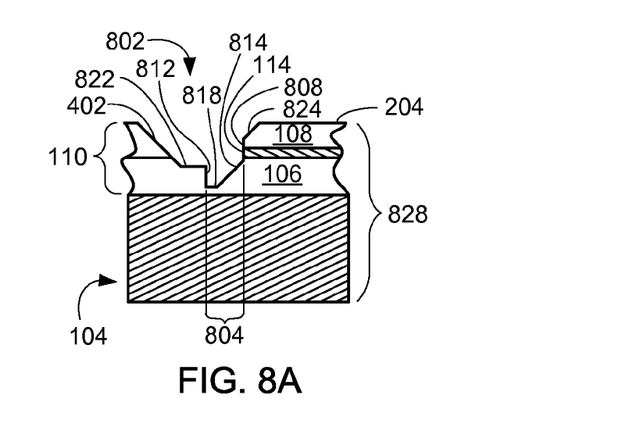
FIG. 8A is the partial cross-sectional view of the structure of FIG. 7 in forming phase of a vertical insertion area structure.

Referring now to FIG. 8A, therein is shown the partial cross-sectional view of the structure of FIG. 7 in forming phase of a vertical insertion area structure 802. The vertical insertion area structure 802, also referred to as the via structure 802, can be formed from the recess 404 of FIG. 4 by a number of steps.

For example, a PLC etch process can be applied to the structure of FIG. 7 wherein the material, such as silica, in the top clad 108 and the bottom clad 106 etches much faster than the hardmask 502 of FIG. 7. The PLC etch process can extend essentially vertically, for example eighty-eight to ninety degrees relative to the horizontal plane containing the upper clad surface 204 of the top clad 108, down and through the gap 702 of FIG. 7 of the hardmask 502.

The PLC etch process can be applied deep enough to remove the portion of the bottom base 408 of FIG. 4 and to remove the portion of the clad sidewalls 402 covering and extending below the optical core 112 of FIG. 1 to form the via structure 802 having a pocket trench 804, also referred to as a well, into the bottom clad 106 of the waveguide assembly 110. The pocket trench 804 of the via structure 802 is characteristic of the PLC etch process applied to the material, the top clad 108, and the bottom clad 106 through the gap 702 used to form present invention, as described for FIG. 7 and FIG. 8A.

For example, the etching process can be such that a vertical side portion 808 of the via structure 802, extending across the open end 114 and two to five microns into the bottom clad 106 is removed. The etching process exposes the open end 114 of the optical core 112 from the vertical side portion 808.

For example, the open end 114 can terminate on a nominally vertical surface of the vertical side portion 808 of the via structure 802. There can be a nominally 45-degree or any angled surface of a section of the clad sidewalls 402 opposite the open end 114.

The pocket trench 804, such as a cavity, is formed below the optical core 112 and includes a substantially vertical trench side 812, a non-horizontal side 814 opposite the vertical trench side 812, and a horizontal side 818 formed by the bottom clad 106. The horizontal side 818 is between and abuts to an end of the vertical trench side 812 and to an end of the non-horizontal side 814 of the via structure 802.

An end of the vertical trench side 812 opposite and above the horizontal side 818 intersects a horizontal step 822 above the vertical trench side 812. The horizontal step 822 is formed from a portion of the bottom base 408 of FIG. 4 covered by the hardmask 502 and prevented from removal by the etching process used to form the pocket trench 804.

The horizontal step 822 can be parallel to the upper clad surface 204 of FIG. 2, and abutted or connected to an end of the section of the clad sidewalls 402 opposite the open end 114 and formed in the bottom clad 106. The horizontal step 822 is between the end of the section of the clad sidewalls 402 opposite the open end 114 and the pocket trench 804.

An end of the non-horizontal side 814 above the horizontal side 818 abuts the vertical side portion 808 below and exposing the open end 114 of the optical core 112. An end of the vertical side portion 808 above the open end 114 is connected to the upper clad surface 204 by a slanted side 824 formed from the portion of the clad sidewalls 402 over the optical core 112 not exposed to the etching process.

The via structure 802, the substrate 104, and depicted portions of the optical core 112, the top clad 108 and the bottom clad 106, can be referred to as an optical base structure 828 of the present invention. Characteristics of the optical base structure 828 described and shown in FIG. 8A are the result of the etching process and formation methods used in the manufacturing of the present invention.

Figure 8B:
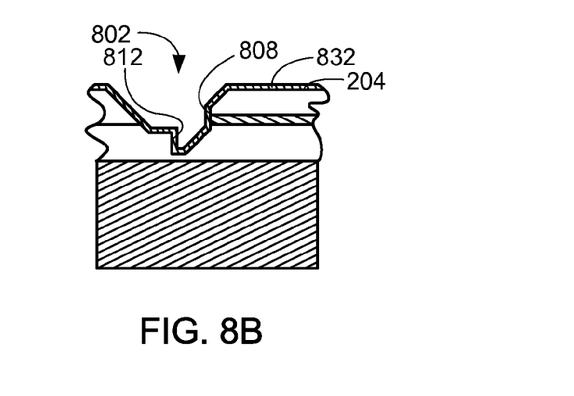
FIG. 8B is the partial cross-sectional view of the structure of FIG. 8A in a metallization phase.

Referring now to FIG. 8B, therein is shown the partial cross-sectional view of the structure of FIG. 8A in a metallization phase. The upper clad surface 204 and the via structure 802 formed in the upper clad surface 204 is covered with a thin reflective film 832, such as a reflective material or a metal, for example.

The thin reflective film 832 can be applied, for example, by sputtering the thin reflective film 832 of a suitable metal, such as gold, over the entire surface using a process configured by well-known means to have weak step-coverage. The weak step-coverage, provided by the sputtering of the thin reflective film 832, means that a side thickness of the metal film on the vertical surfaces, such as the vertical trench side 812 and the vertical side portion 808 with the open end 114 of FIG. 8A, can be much less than a lateral thickness on the non-vertical exposed surfaces.

Figure 8C:
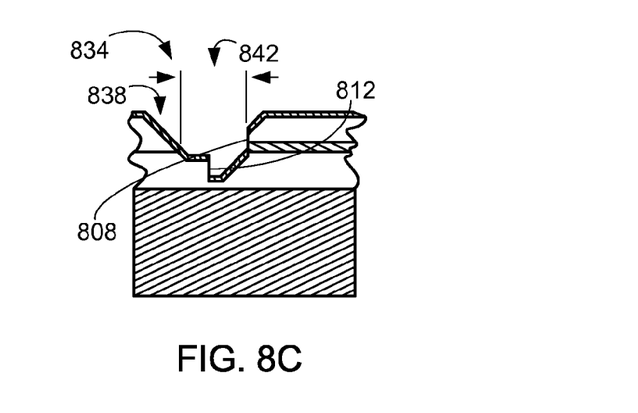
FIG. 8C is the partial cross-sectional view of the structure of FIG. 8B in an etch finishing phase of the first embodiment of the present invention.

Referring now to FIG. 8C, therein is shown the partial cross-sectional view of the structure of FIG. 8B in an etch finishing phase of the first embodiment of the present invention. An optical via 834, also referred to as the optical vertical insertion area, can be formed by removing a small amount of the thin reflective film 832 of FIG. 8B. The small amount can then be removed, for instance with a standard wet-etch, which will remove film thickness at a uniform rate and hence remove all the film forming the side thickness where it is thinner on the vertical surfaces than the non-vertical exposed surfaces, and expose the waveguide exit face.

Portions of the thin reflective film 832 can remain on the other surfaces where it was originally thicker, including the section of the clad sidewalls 402 of FIG. 8B. A mirror 838 of the optical via 834 can be formed by the thin reflective film 832 remaining and covering the optical via 834. The horizontal step 822 of FIG. 8A is between the mirror 838 and the pocket trench 804 of FIG. 8A.

All surfaces of the optical via 834, including the section of the clad sidewalls 402, are covered by the thin reflective film 832 except for the vertical trench side 812, the vertical side portion 808, and the open end 114 which are exposed from the thin reflective film 832. The optical via 834 has a structure characteristic of metal sputtering of the optical via 834 by a weak step-coverage process and uniform removal the sputtered metal by a wet-etch to remove and expose only the vertical surfaces covered by the sputtered metal on the optical via 834.

The dimensions of the optical via 834 can vary. A distance 842, across the pocket trench 804, from the open end 114 of FIG. 8A on the vertical side portion 808 to where an extended waveguide axis would hit the mirror 838 can nominally be in the range of twenty microns. Increasing the distance 842 too much could mean that some of the optical beam or light may run into the bottom of the pocket trench 804 or the vertical trench side 812 before hitting the mirror 838, attenuating the signal strength of the light or the optical beam.

It has been discovered that the optical via 834 having the pocket trench 804 provides for customization and optimization of the optical via 834 for improved efficiency or reduced form factor by enabling the insertion of an optical element, such as a lens, a prism, or a GRIN lens in to or adjacent to the pocket trench 804, to disperse, bend, converge, or any combination thereof, at least one path of light traveling between the open end 114 and the mirror 838 for many other configurable PLC application or uses, such as optical hubs, bridges, and cross-switches.

Figure 9:
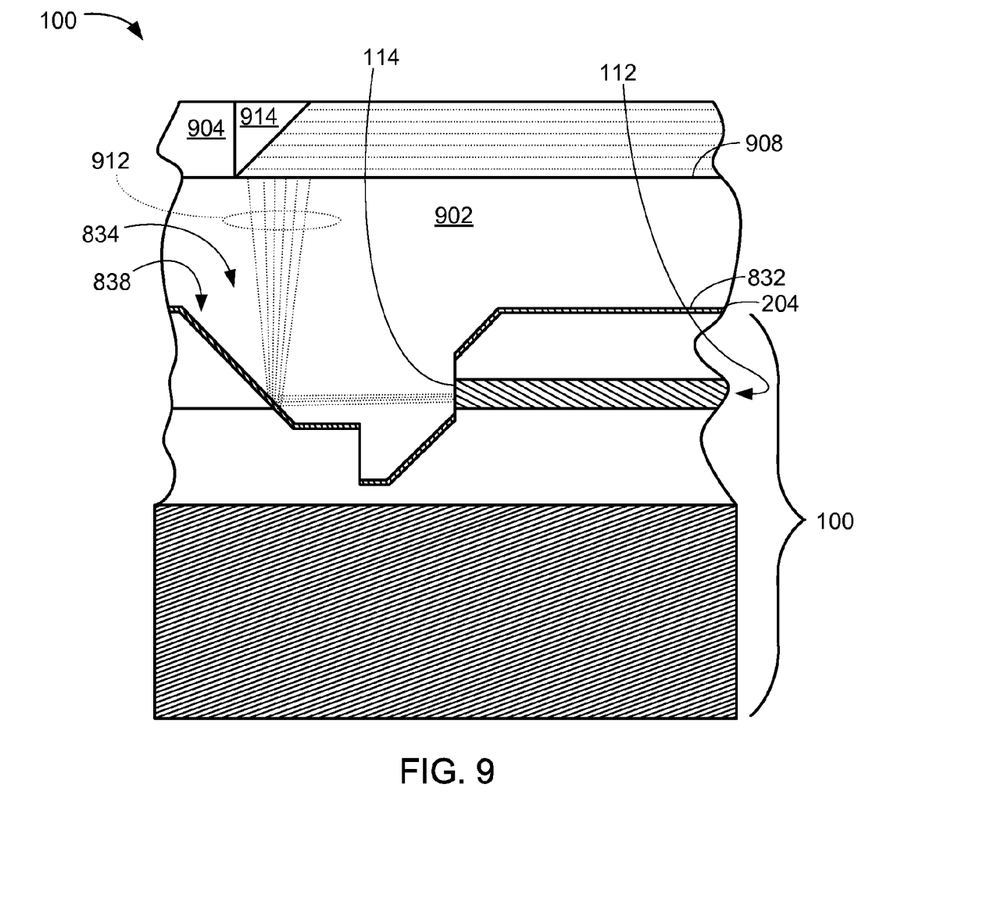
FIG. 9 is the partial cross-sectional view of the integrated circuit coupling system in the first embodiment of the present invention.

Referring now to FIG. 9, therein is shown the partial cross-sectional view of the integrated circuit coupling system 100 in the first embodiment of the present invention. The optical via 834 is shown optionally backfilled with an optically-transparent backfill material referred to as a transparent backfill 902 filling the optical via 834 and covering the thin reflective film 832 on the upper clad surface 204 of the optical via 834. An interface structure 904 can be mounted on a PLC surface 908 of the transparent backfill 902 over the optical via 834.

Light paths 912 represented with dotted lines, exemplify an approximate path of optical beams traveling between the open end 114 of the optical core 112 and the interface structure 904 mounted on the PLC surface 908 of the transparent backfill 902. The optical beams travel through the transparent backfill 902 are reflected and redirected from the mirror 838 to a different directional path to the interface structure 904 or the open end 114, depending on the direction of travel of the optical beams. The interface structure 904 can for instance include a prism 914 for further reflecting or redirecting the light passing through the PLC surface 908 and along a length of the interface structure 904.

It has been discovered that the optical via 834 having a slope of the mirror 838, for instance at 45-degrees from the upper clad surface 204, enables the optical via 834 to decrease the size of the integrated circuit coupling system 100. For example, while a typical connection to an optical fiber must be at the edges of a chip, the optical via 834 can allow for connections at the top of a chip, or PLC, and at an interior location within the overall optical circuit.

In an exemplary application, optical vias can have a layout to match the configuration of optical cores distributed across a face of a multicore fiber and optical cores, oriented to route the light away from the constellation of cores, to individually accessible optical circuits without requiring a fraying separation of the optical cores in the multicore fiber.

Core locations in a multicore fiber are distributed in two dimensions across a face of the multicore fiber are not achievable by the traditional means of routing waveguides to the edge of an optical chip where they are forced into a linear configuration that cannot match a distribution of cores in the multicore fiber.

It has been discovered that the optical via 834 having the mirror 838 and connections distributed across the top surface of a chip can allow for more connections to more optical fiber cores than traditional means of routing waveguides to only the edges of a chip.

It has also been discovered that the slope of the surface of the mirror 838 of the optical via 834 and the processes, described in FIGS. 4 through 8, by which it is manufactured can provide a small, easily manufactured, efficient interface to multicore optical fibers that has been otherwise heretofore elusive. For example, because the optical via 834 with the slope of the surface of the mirror 838 and the processes have tightly controlled dimensions, the transmission of optical beams between the optical fiber and a chip can have very little loss of signal as compared to a standard interface or a grating-based device that can fundamentally let most of the light escape and varies greatly with normal variations in the optical polarization.

Figure 10A:
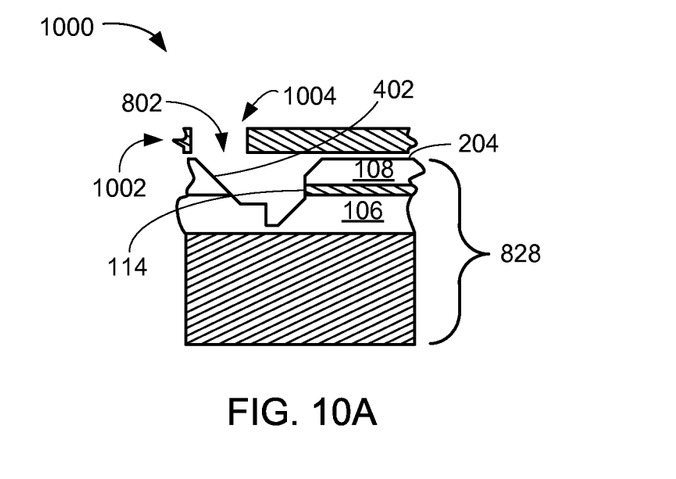
FIG. 10A is the partial cross-sectional view of the structure of FIG. 8A in a masking phase of an integrated circuit coupling system in a second embodiment of the present invention.

Referring now to FIG. 10A, therein is shown the partial cross-sectional view of the structure of FIG. 8A in a masking phase of an integrated circuit coupling system 1000 in a second embodiment of the present invention. The upper clad surface 204 and the via structure 802 of the optical base structure 828 with the top clad 108 and the bottom clad 106 is covered and physically separated from a shadow mask 1002 temporarily placed in near contact above the via structure 802.

The shadow mask 1002 is shown having an aperture 1004 over the section of the clad sidewalls 402 opposite the open end 114. The shadow mask 1002 is placed over the wafer or planar lightwave circuit in preparation for application of metal on the section of the clad sidewalls 402.

Figure 10B:
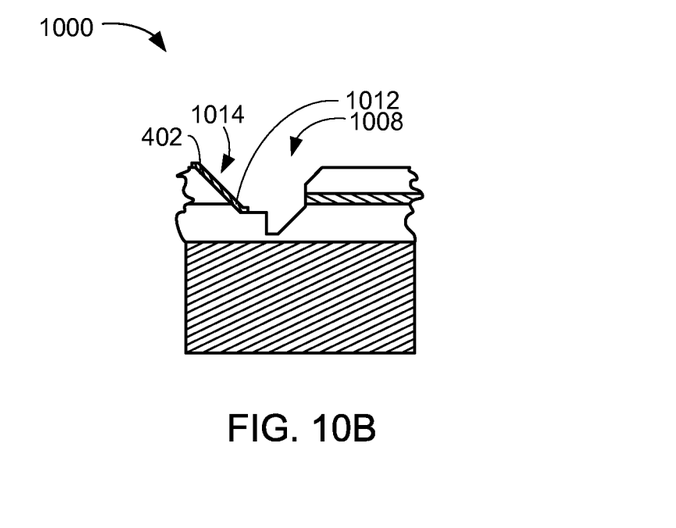
FIG. 10B is the partial cross-sectional view of the integrated circuit coupling system in the second embodiment of the present invention formed from the structure of FIG. 10A.

Referring now to FIG. 10B, therein is shown the partial cross-sectional view of the integrated circuit coupling system 1000 in the second embodiment of the present invention formed from the structure of FIG. 10A. A metal 1012, such as a reflective material, can be deposited through the aperture 1004 of FIG. 10A of the shadow mask 1002 of FIG. 10A only on the section of the clad sidewalls 402 opposite the open end 114.

The metal 1012 can be deposited in different ways. For example, the metal 1012 can be sputtered through the shadow mask 1002 to form a mirror 1014, similar to the mirror 838 of FIG. 8C, resulting in an optical via 1008, also referred to as an optical vertical insertion area, of the second embodiment of the present invention. The optical via 1008 has a structure characteristic of using the aperture 1004 of the shadow mask 1002 to direct the metal deposited directed only at and formed only on the section of the clad sidewall opposite the open end 114. The horizontal step 822 of FIG. 8A is between the mirror 1014 and the pocket trench 804 of FIG. 8A.

Figure 11:
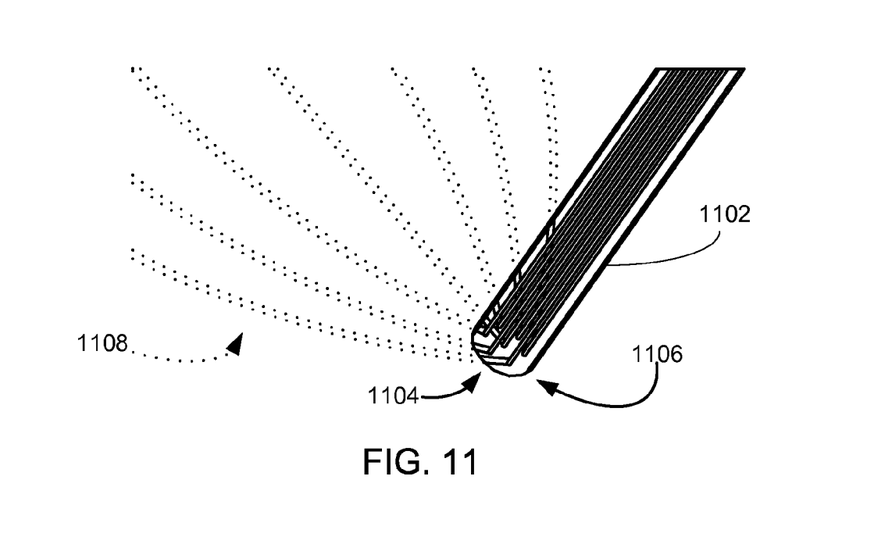
FIG. 11 is an exemplary plan view of a multicore optical fiber for optically coupled to a planar array of waveguides via an array of optical coupling systems.

Referring now to FIG. 11, therein is shown an exemplary plan view of a multicore optical fiber for optically coupled to a planar array of waveguides via an array of optical coupling systems. Shown is a multicore optical fiber 1102 having seven cores 1104 with an end of each of the seven cores 1104 exposed from an open end 1106 of the multicore optical fiber 1102.

The open end 1106 of the multicore optical fiber 1102 can face opposite or abut to an optical component (not shown) such as a PRISM, a refractive or gradient index lens, a plurality of the optical via 834 of FIG. 8C, a plurality of the optical via 1008 of FIG. 10B, or any combination thereof, to form one or more waveguide channels 1108, shown as dotted lines.

The end of each optical component proximal to the multicore optical fiber 1102 can include optical component for optically coupling between one or more of the waveguide channels 1108 and one or more of the seven cores 1104 of multicore optical fiber 1102. The optical component is depicted at the open end 1106 of the multicore optical fiber 1102 in FIG. 11, but have been previously described and shown as the optical via 834, the optical via 1008, or as other embodiments of the present invention.

Demand for increasing capacity in fiber optic networks has spurred interest in new fibers having seven independent optical cores, for example. At both ends of such a fiber, it is necessary to efficiently separate out or disperse each of the seven cores 1104 to provide independent access. Devices at each end of the fiber are complicated and handmade fusions of fiber bundles that have been made to test the fibers but are not practical to manufacture for such an application. There have also been reports of some grating-based devices that are small and easily manufactured, but these fundamentally let most of the light escape and vary greatly with normal variations in the optical polarization. These problems cannot be solved with standard PLC with waveguide access along the edge because the cores are not arranged along a single line.

Optical vias of the present invention can provide a small, easily manufactured, efficient interface to these multicore fibers. The optical vias can be laid out to match the configuration of the optical cores and the waveguides oriented to route the light away from the constellation of cores to individually accessible optical circuits as shown schematically in FIG. 11.

For some applications, it can be mechanically preferable to have the axis of the multicore optical fiber parallel to the PLC waveguide plane rather than perpendicular as shown in FIG. 11. This can be done by placing a reflecting prism above the optical via structure as suggested using the prism 914 of FIG. 9 as an optional element. The challenge here is that an overlying reflector large enough to turn all the optical paths of the multicore optical fiber requires the end face of the optical fiber to be displaced away from the optical via structures, preventing the proximal optical coupling depicted in FIG. 11.

Figure 12:
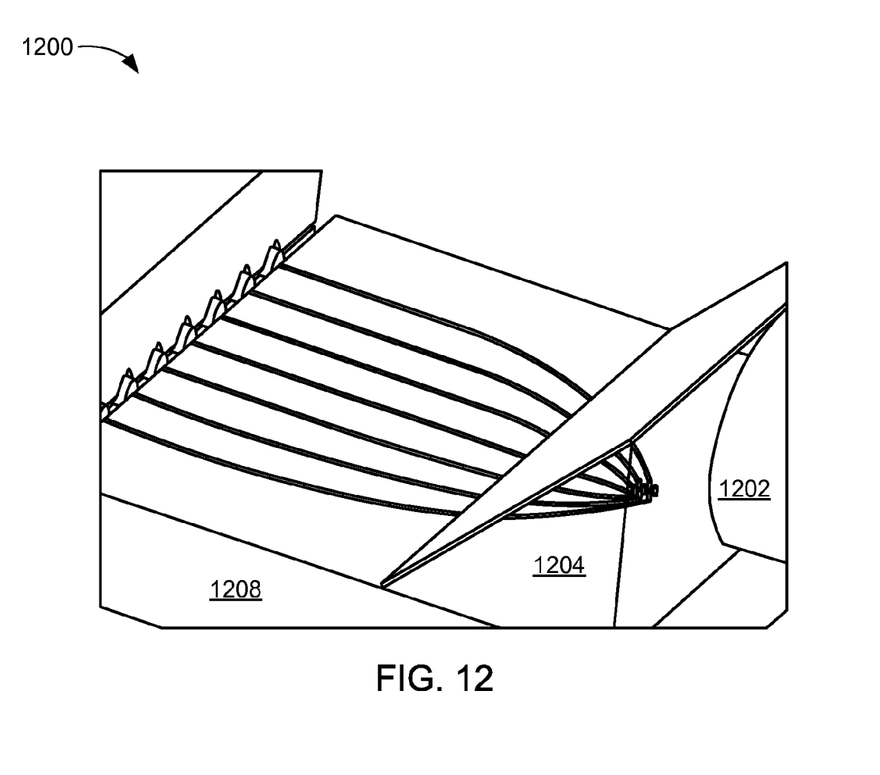
FIG. 12 is an exemplary isometric plan view of an integrated circuit coupling system configured as an array optically coupling the cores of a multicore optical fiber to the waveguides of a PLC via an optical relay in a third embodiment of the present invention.

Referring now to FIG. 12, therein is shown an exemplary isometric plan view of an integrated circuit coupling system 1200 configured as an array optically coupling the cores of a multicore optical fiber to the waveguides of a PLC via an optical relay in a third embodiment of the present invention. The exemplary isometric plan view depicts the integrated circuit coupling system 1200 with a planar lightwave circuit configured as an adapter.

In this view, an image from the end of a fiber displaced away from the PLC onto the array of optical vias, such as the optical via 834 of FIG. 8D, the optical via 1008 of FIG. 10B, or with other embodiments that can be evident based on the present disclosure, and that system, process, or mechanical changes may be made without departing from the scope of the present invention. An optical relay element 1202 or relay lens can, for instance, be a refractive or gradient index (GRIN) lens.

An end of the multicore optical fiber 1102 of FIG. 11 can be axially aligned to the optical relay element 1202, such as one or more lens, gradient index (GRIN) lens, refractive lens, or any combination thereof. An end of the optical relay element 1202, opposite a relay fiber end (not shown) of the optical relay element 1202 axially aligned to the end of the multicore optical fiber 1102, butted against a side of a prism 1204 used to redirect or fold light between a PLC 1208 located below the prism 1204 and the multicore optical fiber 1102.

The PLC 1208 can have multiple mirrors (not shown) forming an array of optical vias each having an individual mirror (not shown), such as the mirror 838 of FIG. 8C or the mirror 1014 of FIG. 10B. With the seven cores 1104 of FIG. 11 of the multicore optical fiber 1102 so displaced, one can bend light paths between the optical relay element 1202 and the multiple mirrors with another mirror or the prism 1204 so that the fiber axis at the coupling end is parallel to the PLC surface, for example.

In many cases, the combination of the optical relay element 1202 and the multiple mirrors of the PLC 1208 provide can be made or produced as a more robust device can be made or produced. The relay, optically folded by a prism and the waveguides from the array of optical vias routed to the edge of the PLC to couple to an array of fibers, enable the multicore optical fiber 1102 to be efficiently terminated into individual fibers of the seven cores 1104 into an easily manufactured device with a footprint of a few square millimeters, for example.

Figure 13:
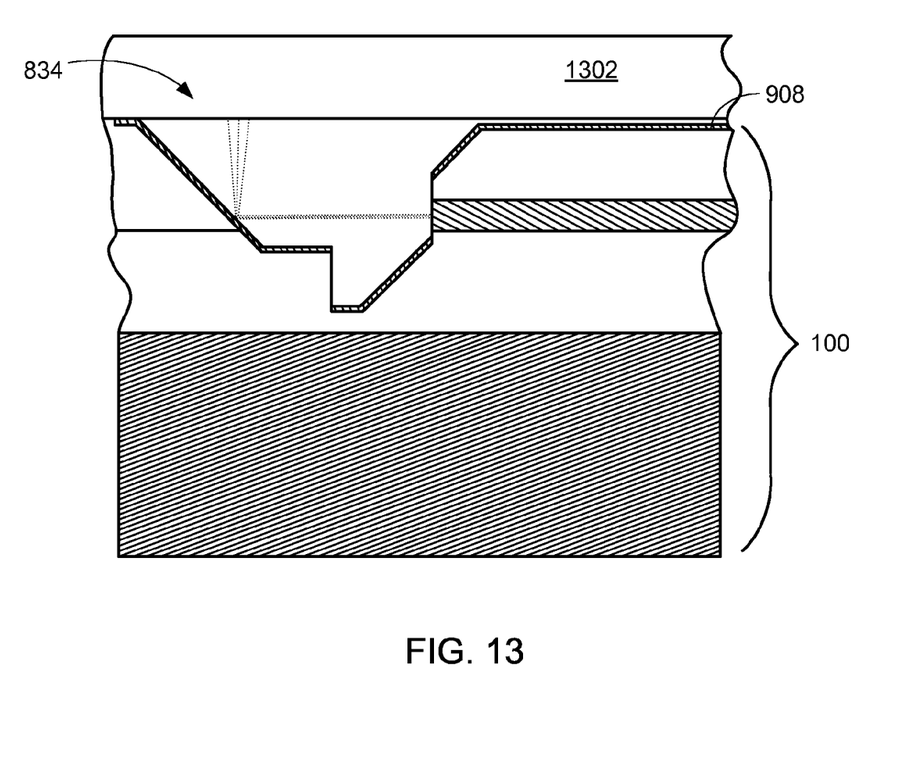
FIG. 13 is the partial cross-sectional view of the integrated circuit coupling system of FIG. 9 connected to a semiconductor component.

Referring now to FIG. 13, therein is shown the partial cross-sectional view of the integrated circuit coupling system 100 of FIG. 9 connected to a semiconductor component 1302. FIG. 13 is shown as having all the same features as FIG. 9, with or without the transparent backfill 902 of FIG. 9, as preferred, and includes the optical beam. The interface structure 904 of FIG. 9 is replaced by the semiconductor component 1302, such as a back-illuminated photodiode, mounted over the optical via 834. The semiconductor component can receive a signal from the optical beam without much loss.

It has been discovered that it is much easier to mate, in a common plane, the semiconductor component 1302, such as a photodiode or photodiode array, over the optical via 384 and to the PLC along a plane parallel to a plane containing the PLC surface 908 to provide a more efficient manufacturing process compared to the traditional mounting of a semiconductor component perpendicular to and at the edge of the PLC.

Figure 14:
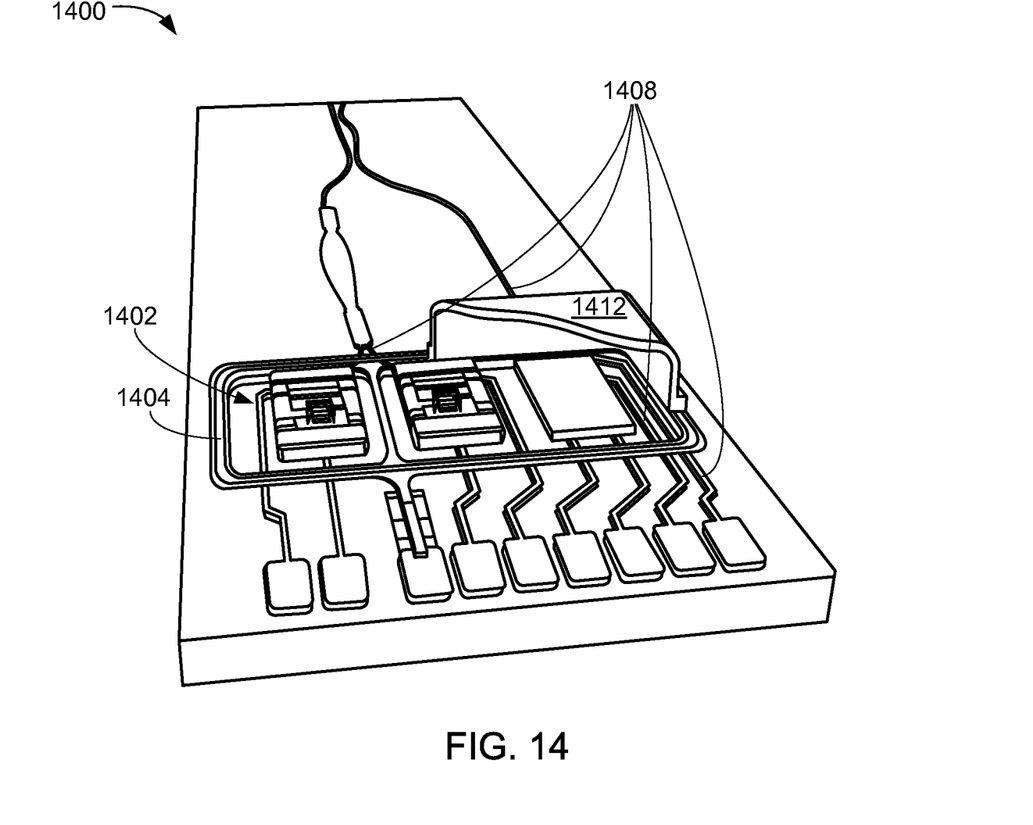
FIG. 14 is a partial isometric cutaway view of an integrated circuit coupling system with an exemplary hermetic seal in a fourth embodiment of the present invention.

Referring now to FIG. 14, therein is shown a partial isometric cutaway view of an integrated circuit coupling system 1400 with an exemplary hermetic seal in a fourth embodiment of the present invention. A semiconductor component 1402 such as a photodiode or a laser can be mounted on a surface of the PLC 102 having the optical via 834 of FIG. 9, the optical via 1008 of FIG. 10B, or a combination thereof and away from an edge of the chip or of the PLC 102.

For example, a back-illuminated photodiode can be mounted over the optical via 834 and hermetically sealed by attaching a small lid 1412 over the optical via 834, the optical via 1008, or one or more of such semiconductor components.

The PLC 102, for example, can be configured to have a metal ring 1404 bonded to the uppermost PLC silica layers, such as the upper clad surface 204 of FIG. 9, with the optical and electrical channels 1408 passing hermetically under the ring 1404 and within the PLC silica layers. The lid 1412, such as a stamped metal cap, can then be attached to the ring 1404 by soldering or laser welding to provide an inexpensive and effective hermetic packaging technique not possible with traditional edge-mounting techniques.

It has been discovered that combinations of the optical via 834 and the semiconductor component 1402, such as a photodiode or a laser, can be mounted to the top of the PLC to provide efficient and cost-saving configurations of the optical modules.

It has been discovered that combinations of the optical via 834 and the semiconductor component 1402, such as a photodiode or a laser, can be mounted to the top of the PLC to further shrink the size of an integrated circuit package and can also reduce the expense of manufacture. The present invention with the optical via 834 and the semiconductor component 1402 mounted to the top of the PLC provides a smaller hermetic region directly on the optical chip can be then used to seal all necessary components.

For example, because hermetic packaging is required for such components, when such components are directly attached to the edge of a PLC, it is necessary to devise a hermetic package to contain the semiconductor component and the PLC as well. Such a package is generally much larger and much more expensive than would be required for the semiconductor component alone.

Figure 15:
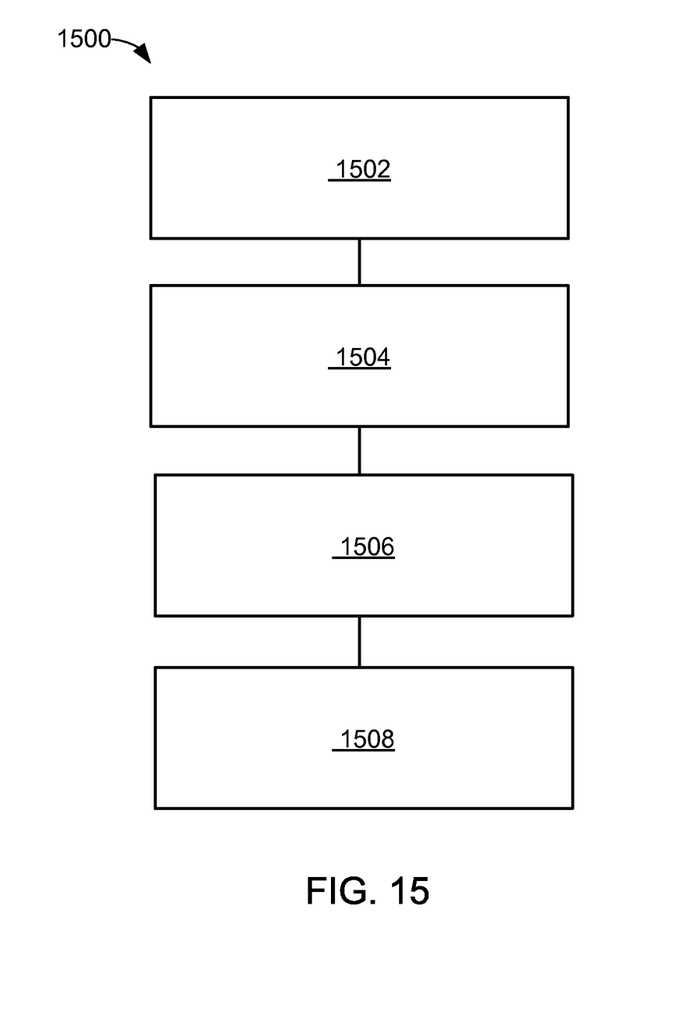
FIG. 15 is a flow chart of a method of manufacture of an integrated circuit coupling system in a further embodiment of the present invention.

Referring now to FIG. 15, therein is shown a flow chart of a method 1500 of manufacture of an integrated circuit coupling system in a further embodiment of the present invention. The method 1500 includes: forming a waveguide assembly, having a top clad over an open end of an optical core in a block 1502; forming a first photoresist having a base photoresist pattern shape with sloped photoresist sidewalls tapered down to expose a portion of the top clad in a block 1504; forming a recess having clad sidewalls from the portion of the top clad exposed by the base photoresist pattern shape, the clad sidewalls having a shape replicating a shape of the base photo resist pattern shape in a block 1506; and forming an optical vertical insertion area, from the clad sidewalls forming the recess, having a pocket trench, a horizontal step, and a mirror with a reflective material selectively applied to a section of the clad sidewalls and exposing the open end opposite to the mirror, the horizontal step between the mirror and the pocket trench in a block 1508.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing integrated circuit coupling systems fully compatible with conventional manufacturing methods or processes and technologies.

Another important aspect of the present invention is that it valuably supports and services the historical trend of reducing size and costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. An integrated circuit coupling system comprising:
a substrate;
a top clad having clad sidewalls over the substrate;
an optical core having an open end between the substrate and the top clad; and
an optical vertical insertion area having a mirror, a horizontal step, and a pocket trench formed, through the top clad, below and between the open end and the mirror opposite the open end exposed in the optical vertical insertion area, the horizontal step between the mirror and the pocket trench;
an interface structure mounted over the optical vertical insertion area; and wherein:
the substrate is below the optical core.

2. The system as claimed in claim 1 wherein the optical vertical insertion area includes the horizontal step between the open end and the pocket trench.

3. The system as claimed in claim 1 further comprising a transparent backfill covering the optical vertical insertion area.

4. The system as claimed in claim 1 further comprising a semiconductor component mounted over the optical vertical insertion area.

5. The system as claimed in claim 1 further comprising a multicore optical fiber optically coupled through the optical vertical insertion area.

6. The system as claimed in claim 1 further comprising a lid over and hermetically sealing the optical vertical insertion area.

7. The system as claimed in claim 1 further comprising a prism mounted over the optical vertical insertion area.

8. The system as claimed in claim 1 further comprising a back-illuminated photodiode mounted over the optical vertical insertion area.

* * * * *